(12) United States Patent
Wang

(10) Patent No.: US 6,404,654 B1
(45) Date of Patent: Jun. 11, 2002

(54) SELF-OSCILLATION TYPE RESONANT FLYBACK CONVERTER UTILIZING CHARGE STORED EFFECT OF THE P-N DIODE

(75) Inventor: Johnson Wang, Chengdo (CN)

(73) Assignee: Jue Wang, S.L.C., UT (US)

( * ) Notice: Subject to any disclaimer, the term of this patent is extended or adjusted under 35 U.S.C. 154(b) by 0 days.

(21) Appl. No.: 09/892,916

(22) Filed: Jun. 26, 2001

(51) Int. Cl.[7] .............................................. H02M 3/335
(52) U.S. Cl. ........................ 363/19; 363/18; 363/56.12
(58) Field of Search ........................... 363/18, 19, 56.12

(56) References Cited

U.S. PATENT DOCUMENTS

| | | | |
|---|---|---|---|
| 5,412,555 A | * 5/1995 | Uramoto | 363/18 |
| 5,594,629 A | 1/1997 | Steigerwald | 363/21 |
| 5,995,382 A | * 11/1999 | Miyazaki et al. | 323/902 |
| 6,188,588 B1 | 2/2001 | Hemena et al. | 363/21 |
| 6,229,717 B1 | 5/2001 | Blanco et al. | 363/21 |

* cited by examiner

*Primary Examiner*—Shawn Riley

(57) ABSTRACT

A self-oscillation type resonant flyback converter includes a series combination of a primary winding and a switching transistor. A secondary winding is connected to a power diode and to an output capacitor. A feedback winding is connected to a delay driving circuit comprising a delay diode, a constant-current diode and a capacitor. The delay driving circuit is provided to delay a positive feedback signal from said feedback winding, so that when said power diode becomes non-conducting, said delay diode becomes in the reverse conduction state, starting a free resonance period that concludes when the said delay diode becomes non-conducting and the switching transistor is achieved at zero voltage switching.

5 Claims, 2 Drawing Sheets

SELF-OSCILLATION TYPE RESONANT FLYBACK CONVERTER UTILIZING CHARGE STORED EFFECT OF THE P-N DIODE

OBJECT OF THE INVENTION

The present invention relates to a self-oscillation type resonant flyback converter utilizing charge stored effect of the P-N diode. The switching action of the switching transistor is done at zero voltage through the selections of a reverse recovery time of said delay diode and power diode, respectively. Due to the simplicity of the circuit, i.e., very few components, and its high reliability, it can be implemented using high-density packaging techniques. Such a resonant converter is useful in high-voltage, high-power dc-to-dc converters for distributed power supply systems.

BACKGROUND OF THE INVENTION

A ringing choke converter has been often utilized as a self-oscillation type power supply. Referring to FIG. 3, a conventional ringing choke converter comprises a transformer with a primary winding inductance Lpri, a secondary winding inductance Lsec and a feedback winding inductance Lfb. A primary-side switching transistor Q1 is connected in series with the primary winding Lpri across an input dc voltage Ein and an input filter capacitor Cin, a snubber capacitor Cs is connected in parallel with switching transistor Q1. A secondary-side power diode D1 is connected in series with the secondary winding Lsec across an output dc voltage Eout and an output filter capacitor Cout. Between the feedback winding Lfb and the base of the switching transistor Q1 a current-limiting resistor R1, a speed-up capacitor C1, and a diode D2 are connected in FIG. 3.

When switching transistor Q1 is ON, energy is stored in primary winding Lpri. When switching transistor Q1 is OFF, stored energy is released through a secondary winding Lsec. The output voltage is regulated by controlling the ON and OFF times of switching transistor Q1. When the switching transistor Q1 is turned off, because of the snubber action of said snubber capacitor Cs so that the switching transistor Q1 can be controlled to achieve zero-voltage OFF switching; when the switching transistor Q1 is turned on, because of the speed-up action of the speed-up capacitor C1 so as to forward bias the base of the switching transistor Q1 that is controlled to form high-voltage ON switching. Because of discharge of the snubber capacitor Cs, causing a current spike, the product of the collector current and the voltage between the collector and emitter causes a large switching loss at the time when the switching transistor Q1 is turned on, especially in case of high output voltage and under high power conditions.

The design of a conventional flyback converter (square wave systems) is valid, but not in its integrity. A resonant flyback converter is implemented by an accurate design of its driving circuit.

SUMMARY OF THE INVENTION

In view of the foregoing, it is an object of the present invention to provide a self-oscillation type resonant flyback converter that overcomes the above-described drawbacks of prior art without modifying topology. It is a further object of the present invention to provide a self-oscillation type resonant flyback converter that facilitates soft switching, at arbitrary frequencies, has an improved efficiency and could offer a larger power than conventional flybak converter.

A self-oscillation type resonant flyback converter, comprising a transformer, a single primary-side switching transistor, a power diode and a delay driving circuit, is controlled to operate in a "natural" zero-voltage switching mode. By selecting the component values appropriately, said switching transistor could be controlled to achieve zero-voltage OFF switching and zero-voltage ON switching.

The operation of the resonant converter is such that during any non-conducting period of the switching transistor and once the power diode is in the conduction state, the delay diode also starts a conducting period, the current of the delay diode flows through a constant-current diode (reverse conducting), a capacitor and a feedback winding. When the power diode stops conduction, the delay diode becomes in reverse conduction state due to its charge stored effect more than that of the power diode, the switching transistor is still in a non-conducting state (reverse biased the base), the resonant circuit formed by the snubber capacitor and a inductance of the transformer reduces to zero/valley the voltage across between terminals of the snubber capacitor, at the moment the delay diode stops reverse conduction, the switching transistor starts conduction.

In order to boost the performance of resonant converter which accepts a broad range of input voltage and guarantees switching at zero voltage of the switching transistor. By proper selection of the reverse recovery time of the power diode, producing reverse recovery current of the power diode through the secondary winding and the output capacitor before a free resonance period starts, adding to energy of resonant circuit, forming effective to discharge an electric charge of said snubber capacitor.

In brief, the resonant converter guarantees switching at zero/valley voltage depending on the delay diode's characteristic, and guarantees switching at zero voltage with a broad range of input voltage depending on the power diode's characteristic.

BRIEF DESCRIPTION OF THE DRAWINGS

A more detailed explanation of the present invention is to be found in the following description, based on the figures attached, in which.

PREFERRED EMBODIMENT

Figure 1:
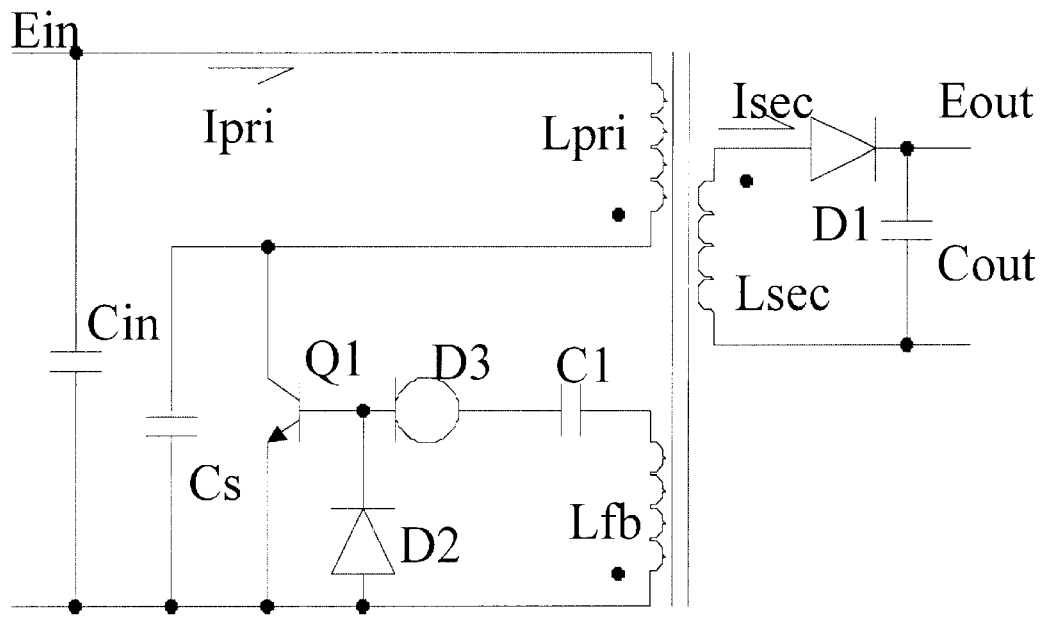
FIG. 1 shows an electrical schematic of a self-oscillation type resonant flyback converter according to the present invention.
Figure 3:
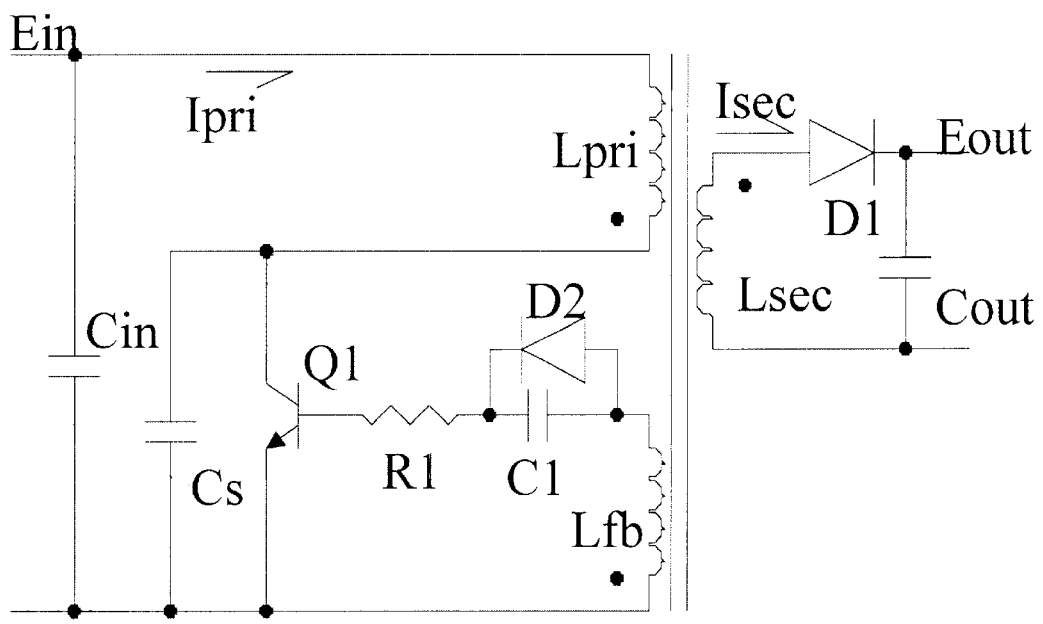
FIG. 3 shows a construction of a conventional self-oscillation type flyback converter.

In FIG. 1 there is shown a preferred embodiment of a self-oscillation type resonant flyback converter comprising a transformer with a primary winding inductance Lpri, a secondary winding inductance Lsec and a feedback winding inductance Lfb. A primary-side switching transistor Q1 is connected in series with the primary winding Lpri across an input dc voltage Ein and an input filter capacitor Cin, a snubber capacitor Cs is connected in parallel with switching transistor Q1. A secondary-side power diode D1 is connected in series with the secondary winding Lsec across an output dc voltage Eout and an output filter capacitor Cout.

Figure 2:
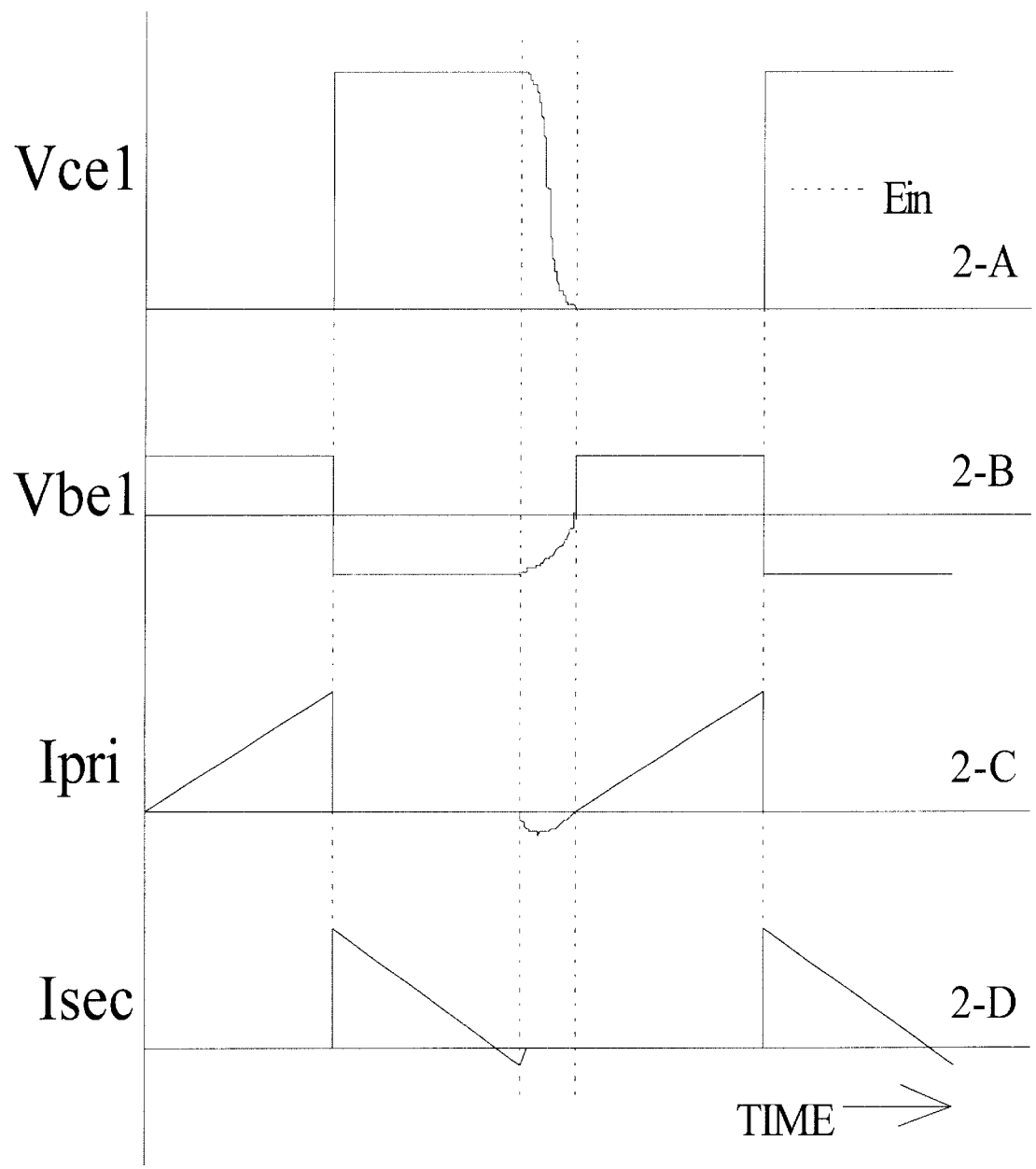
FIG. 2 shows graphically the voltage and current waveforms of FIG. 1.

In parallel with the feedback winding there is a delay driving circuit formed by a delay diode D2, a constant-current diode D3 and a capacitor C1, wherein said delay diode D2 is connected in parallel with the base and emitter of the switching transistor Q1 in FIG. 1. The primary-side current is designated as Ipri, and the secondary-side current is designated as Isec in FIG. 1. FIG. 2 graphically illustrates the current and voltage waveforms for operating the converter of FIG. 1 in a "natural" zero-voltage switching mode.

The operation of the resonant flyback converter is such that during any non-conducting period of the switching transistor Q1 and once the power diode D1 is in the conduction state, the delay diode D2 also starts a conducting period, a current of D2 flows through the constant-current diode (reverse conducting) D3, the capacitor C1 and the feedback winding (dotted terminal is positive) Lfb. When the power diode D1 stops conduction, the delay diode D2 becomes in reverse conduction state due to its charge stored effect more than that of the power diode D1, the switching transistor Q1 is still in a non-conducting state (reverse biased the base), the resonant circuit formed by the snubber capacitor Cs and the inductance Lpri (or Lsec) of the transformer reduces to zero/valley the voltage across between terminals of the snubber capacitor Cs, at the moment the delay diode D2 stops reverse conduction and the switching transistor Q1 starts conduction. The time the energy is transferred between Cs and Lpri, is called the resonant time, Tres (a half of the Lpri Cs resonant period), which is equal to the delay time of the delay driving circuit, i.e., the reverse recovery time of the delay diode D2.

Because the constant-current diode D3 controls the intensity of the positive feedback signal from the feedback winding Lfb during the resonant time Tres, so that any change of a driving pulse-amplitude from the feedback winding Lfb does not affect the reverse recovery time of the delay diode D2. The accuracy of said zero/valley voltage tracking is mainly dependent on its consistency of the reverse recovery time of D2 in mass production and this can be made very accurately in diode.

In operation, the switching transistor Q1 turned on to build up current in the transformer primary winding inductance Lpri. Q1 is then switched off, interrupting the primary inductance current Ipri. The core energy is then transferred to the secondary as current flows in the secondary winding inductance Lsec. The power diode D1 is turned on when Q1 turns off so that the secondary current Isec flows in D1. This has the charge stored effect in D1 (P-N type diode). By proper selection of the power diode D1, after the secondary current Isec reaches zero, an instantaneous reverse current flows in D1 through the secondary winding Lsec and the output capacitor Cout, that is, a part of energy is transferred from the output capacitor Cout to the secondary winding Lsec, i.e., adding to energy of resonant circuit. Then, the power diode D1 stops reverse conduction and inductance Lsec or Lpri resonates with capacitance Cs, causing the voltage across between terminals of the power diode D1 to ring up toward twice and over the voltage Eout due to charge stored effect of D1. This voltage, transformed by the transformer, is just enough to ring the voltage Vcel on Q1's collector to zero. Hence, the Q1 is zero voltage switched for the case where the converter is operated to have a 50%, even less duty cycle.

Although the power diode D1 is a fast recovery rectifier, it still could the reverse conduction during its reverse recovery time. By proper selection of the component values, D1 is left on to allow a sufficient reversal current in Lsec such that energy build up in Lsec to allow the voltage across Q1 to resonant to zero, thus allowing for zero voltage switching of Q1 with a broad range of input voltage.

It should be noted that the snubber capacitor Cs contains a parasitic capacitance in the transformer and the switching transistor Q1. In the zero voltage switching mode, energy that is stored in said distributed capacitance when Q1 is OFF is not dissipated within Q1 when it is turned on, but is resonated back to the input dc voltage Ein. Accordingly, such a resonant flyback converter is able to cope with a high-voltage and high-power load.

What is claimed is:

1. Self-oscillation type resonant flyback converter comprising:

a series combination of a primary winding and a switching transistor;

a secondary winding is connected to a power diode and to an output capacitor;

a feedback winding is connected to a delay driving circuit that comprises a delay diode, a constant-current diode and a capacitor;

said delay driving circuit is provided to delay a positive feedback signal from said feedback winding, so that when said power diode becomes non-conducting, said delay diode becomes in the reverse conduction state, starting a free resonance period that concludes when the said delay diode becomes non-conducting;

a snubber capacitor connected in parallel with said switching transistor; and reverse recovery current in said power diode being effective to discharge an electric charge of said snubber capacitor.

2. The converter of claim 1 wherein said free resonance period has a predetermined duration that is equal to a delay time of said delay driving circuit.

3. The converter of claim 1 wherein said switching transistor is a bipolar junction transistor (BJT).

4. The converter of claim 1 wherein zero-voltage switching characteristic is implemented as said switching transistor has a 50% or less or greater duty cycle.

5. The converter of claim 1, further comprising frequency control means for regulating the output voltage.

* * * * *